US011221495B2

(12) United States Patent
Svensson et al.

(10) Patent No.: US 11,221,495 B2
(45) Date of Patent: Jan. 11, 2022

(54) AID FOR A DRIVER WITH IMPAIRED FIELD OF VIEW

(71) Applicant: Volvo Car Corporation, Gothenburg (SE)

(72) Inventors: Kim Svensson, Gothenburg (SE); Andreas Sandberg, Bollebygd (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/994,754

(22) Filed: Aug. 17, 2020

(65) Prior Publication Data

US 2021/0055566 A1 Feb. 25, 2021

(30) Foreign Application Priority Data

Aug. 20, 2019 (EP) .................................... 19192451

(51) Int. Cl.
*G02B 27/01* (2006.01)
*G06T 7/70* (2017.01)
(Continued)

(52) U.S. Cl.
CPC .......... *G02B 27/0179* (2013.01); *B60K 35/00* (2013.01); *B60Q 9/008* (2013.01);
(Continued)

(58) Field of Classification Search
CPC ............ G02B 27/0101; G02B 27/0179; G02B 27/01; G02B 2027/0141;
(Continued)

(56) References Cited

U.S. PATENT DOCUMENTS 6,327,536 B1 12/2001 Tsuji et al.
9,861,276 B2 1/2018 Crabb et al.
(Continued)

FOREIGN PATENT DOCUMENTS

CN 106228825 A 12/2016
CN 108010266 A 5/2018
EP 2428833 A1 3/2012

OTHER PUBLICATIONS

Feb. 5, 2020 European Search Report issued on International U.S. Appl. No. 19/192,451.

(Continued)

*Primary Examiner* — Christopher E Leiby
(74) *Attorney, Agent, or Firm* — Clements Bernard Walker; Christopher L. Bernard (57) ABSTRACT

The disclosed subject matter generally relates to alerting a vehicle driver having impaired eye sight of an object present in a portion of a field of view of the driver where the driver has impaired eye sight. With embodiments of the present disclosure, a driver with impaired eye sight may be provided with an alert when an object is present in a portion of a field of view of the driver where the driver has impaired eye sight. In this way may drivers who otherwise may feel uncomfortable driving due to impaired eye sight in parts of their field of view, be provided with an aid for safely driving the vehicle. This provides for improved quality of life for the person who may be able to safely drive the vehicle, and also for an improved safety when the person drives the vehicle.

20 Claims, 7 Drawing Sheets

(51) Int. Cl.
*B60K 35/00* (2006.01)
*B60Q 9/00* (2006.01)
*G06K 9/00* (2006.01)
*G09G 5/38* (2006.01)
*G06F 3/01* (2006.01)

(52) U.S. Cl.
CPC ...... *G02B 27/0101* (2013.01); *G06K 9/00791* (2013.01); *G06T 7/70* (2017.01); *G09G 5/38* (2013.01); *B60K 2370/149* (2019.05); *B60K 2370/1529* (2019.05); *B60K 2370/179* (2019.05); *B60K 2370/21* (2019.05); *G02B 2027/014* (2013.01); *G02B 2027/0141* (2013.01); *G02B 2027/0181* (2013.01); *G06F 3/012* (2013.01); *G06T 2207/30252* (2013.01); *G09G 2380/10* (2013.01)

(58) Field of Classification Search
CPC ...... G02B 2027/0181; G02B 2027/014; G06T 7/70; G06T 2207/30252; B60Q 9/008; G06K 9/00791; B60R 1/00; B60R 2300/305; B60R 2300/8093; B60R 2300/402; G09G 5/38; G09G 2380/10; B60K 35/00; B60K 2370/191; B60K 2370/52; B60K 2370/155; B60K 2370/178; B60K 2370/66; B60K 2370/193; B60K 2370/177; B60K 2370/21; B60K 2370/1868; B60K 2370/1529; B60K 2370/149; B60K 2370/179; G06F 3/012
See application file for complete search history.

(56) References Cited

U.S. PATENT DOCUMENTS

| | | |
|---|---|---|
| 10,024,960 B2 | 7/2018 | Brandt |
| 10,331,207 B1* | 6/2019 | Simmons ........... G02B 27/0172 |
| 2010/0253540 A1* | 10/2010 | Seder .................... G01S 13/867 |
| | | 340/905 |
| 2013/0249684 A1 | 9/2013 | Hatakeyama et al. |
| 2014/0019005 A1 | 1/2014 | Lee et al. |
| 2016/0063761 A1 | 3/2016 | Sisbot et al. |
| 2018/0249151 A1 | 8/2018 | Freeman et al. |
| 2020/0050265 A1* | 2/2020 | Krishnakumar ........ G06F 3/013 |

OTHER PUBLICATIONS

Kunimatsu, Sanuki et al., An assessment of driving fitness in patients with visual impairment to understand the elevated risk of motor vehicle accidents, BMJ Open, 2015, pp. 1-11.

* cited by examiner

AID FOR A DRIVER WITH IMPAIRED FIELD OF VIEW

TECHNICAL FIELD

The present disclosure claims the benefit of priority of co-pending European Patent Application No. 19192451.3, filed on Aug. 20, 2019, and entitled "AID FOR A DRIVER WITH IMPAIRED FIELD OF VIEW," the contents of which are incorporated in full by reference herein.

TECHNICAL FIELD

The present disclosure generally relates to a system and a method for alerting a vehicle driver, having impaired eye sight, of an object present in a portion of a field of view of the driver where the driver has impaired eye sight.

BACKGROUND

Many drivers have experienced vehicles suddenly appearing from the so-called blind spot. The blind spot in the automotive industry is generally a part of the vehicle surroundings that are difficult to see for the driver of the vehicle. The blind spot is often somewhat behind the driver and is particularly relevant when changing lanes and when other vehicles are approaching from behind.

Part of the population suffer from defects in the eye sight that affect the visual field of view. In some jurisdictions this may lead to a withdrawal of the person's driver's license, but perhaps more importantly, a driver with defects in the visual field of view may cause hazardous situations leading to accidents and severe personal and structural damage. Such situations are of course crucial to avoid. Furthermore, there is also a desire to provide persons with defect field of view with the possibility to maintain their driver's licence and thereby improve their quality of life.

There is thus a desire to provide a driving aid for persons with impaired eye sight in the visual field of view.

SUMMARY

The disclosed subject matter generally relates to alerting a vehicle driver having impaired eye sight of an object present in a portion of a field of view of the driver where the driver has impaired eye sight.

With embodiments of the present disclosure, a driver with impaired eye sight may be provided with an alert when an object is present in a portion of a field of view of the driver where the driver has impaired eye sight. In this way may drivers who otherwise may feel uncomfortable driving due to impaired eye sight in parts of their field of view, be provided with an aid for safely driving the vehicle. This provides for improved quality of life for the person who may be able to safely drive the vehicle, and also for an improved safety when the person drives the vehicle.

The above advantages are obtained by providing a system with prior knowledge of the quality of the driver's field of view. This prior knowledge may in some embodiments be provided in the form of a predetermined map of the driver's field of view including indications of the portion or portions of the field of view of the driver where the driver has impaired eye sight.

Based on the prior knowledge, a location of a detected object in the driver's field of view may be compared to the field of view of the driver. When the object is determined to be present in a portion of a field of view of the driver where the driver has impaired eye sight, an alert is provided to the driver indicating the presence of the object. Preferably, a visual alert is provided in a zone of the driver's field of view where the driver has proficient sight. Accordingly, by a mapping of the object location into the predetermined map of the driver's field of view, it may be determined whether the driver can see the object. If it is concluded that the driver cannot see the object, an alert is provided to the driver who may react to the object.

Accordingly, the present disclosure relates to, in a first aspect, a control unit for alerting a vehicle driver, having impaired eye sight, of an object present in a portion of a field of view of the driver where the driver has impaired eye sight, the control unit being configured to: receive an indication of a location of a detected object, relative the vehicle; determine, based on the received indication of the location of the object, that the detected object is at least partly within the portion of the field of view of the driver where the driver has impaired eye sight; and generate, in response to determining that the detected object is at least partly within the portion of the field of view of the driver where the driver has impaired eye sight, a signal to control an alerting device to provide an alert to the driver indicating the presence of the object.

In embodiments, the individual driver's eye sight in the field of view from the driver's seat may be pre-calibrated and stored in a predetermined map including indications of the portion of the field of view of the driver where the driver has impaired eye sight.

In this way, a personal and accurate map of the driver's individual field of view including portions of the field of view of the driver where the driver has impaired eye sight, as seen from the driver's seat is created.

In a second aspect, there is provided a projection device for alerting a vehicle driver, having impaired eye sight, of an object present in a portion of a field of view of the driver where the driver has impaired eye sight, the projection device being configured to: receive an indication that a location of the detected object overlaps, at least partly, the portion of the field of view of the driver where the driver has impaired eye sight; project, in response to an indication that the location of the detected object overlaps, at least partly, the portion of the field of view of the driver where the driver has impaired eye sight, a visual alert in the field of view of the driver indicating the presence of the object.

In a third aspect, there is provided a system for alerting a vehicle driver, having impaired eye sight, of an object present in a portion of a field of view of the driver where the driver has impaired eye sight, the system comprising: an alerting device configured to provide an alert to the driver; and a control unit configured to: obtain an indication of a location of an object, relative the vehicle, wherein the object is detected by an object detection system of the vehicle; determine, based on the received indication of the location of the object, that the detected object is at least partly within the portion of a field of view of the driver where the driver has impaired eye sight; and when the object is determined to be present in portion of a field of view of the driver where the driver has impaired eye sight, control the alerting device to provide an alert to the driver indicating the presence of the object.

In a fourth aspect, there is provided a method for alerting a vehicle driver, having impaired eye sight, of an object present in a portion of a field of view of the driver where the driver has impaired eye sight, the method comprising the steps of: detecting an object in the proximity of the vehicle in a forward-looking view of the driver; determining, based on the location of the object, that the detected object is at least partly within the portion of a field of view of the driver where the driver has impaired eye sight, and providing an alert to the driver indicating the presence of the object.

In a fifth aspect, there is provided a computer program product comprising a computer readable medium having stored thereon computer program means for alerting a vehicle driver, having impaired eye sight, of an object present in a portion of a field of view of the driver where the driver has impaired eye sight, wherein the computer program product comprises: code for determining, based on the location of a detected object, that the detected object is at least partly within the portion of a field of view of the driver where the driver has impaired eye sight, and code for providing an alert to the driver indicating the presence of the object.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF DRAWINGS

These and other aspects of the disclosed subject matter will now be described in more detail, with reference to the appended drawings showing example embodiments of the present disclosure, wherein.

DESCRIPTION OF EMBODIMENTS

In the present detailed description, various embodiments of a system and method according to the present disclosure are described. However, embodiment of the present disclosure may be realized in many different forms and should not be construed as limited to the embodiments set forth herein; rather, these embodiments are provided for thoroughness and completeness, and to fully convey the scope of the disclosure to the skilled person. In some instances, well known structures and devices are shown in block diagram form in order to avoid obscuring the novelty of the exemplary embodiments presented herein. Like reference characters refer to like elements throughout.

Figure 1:
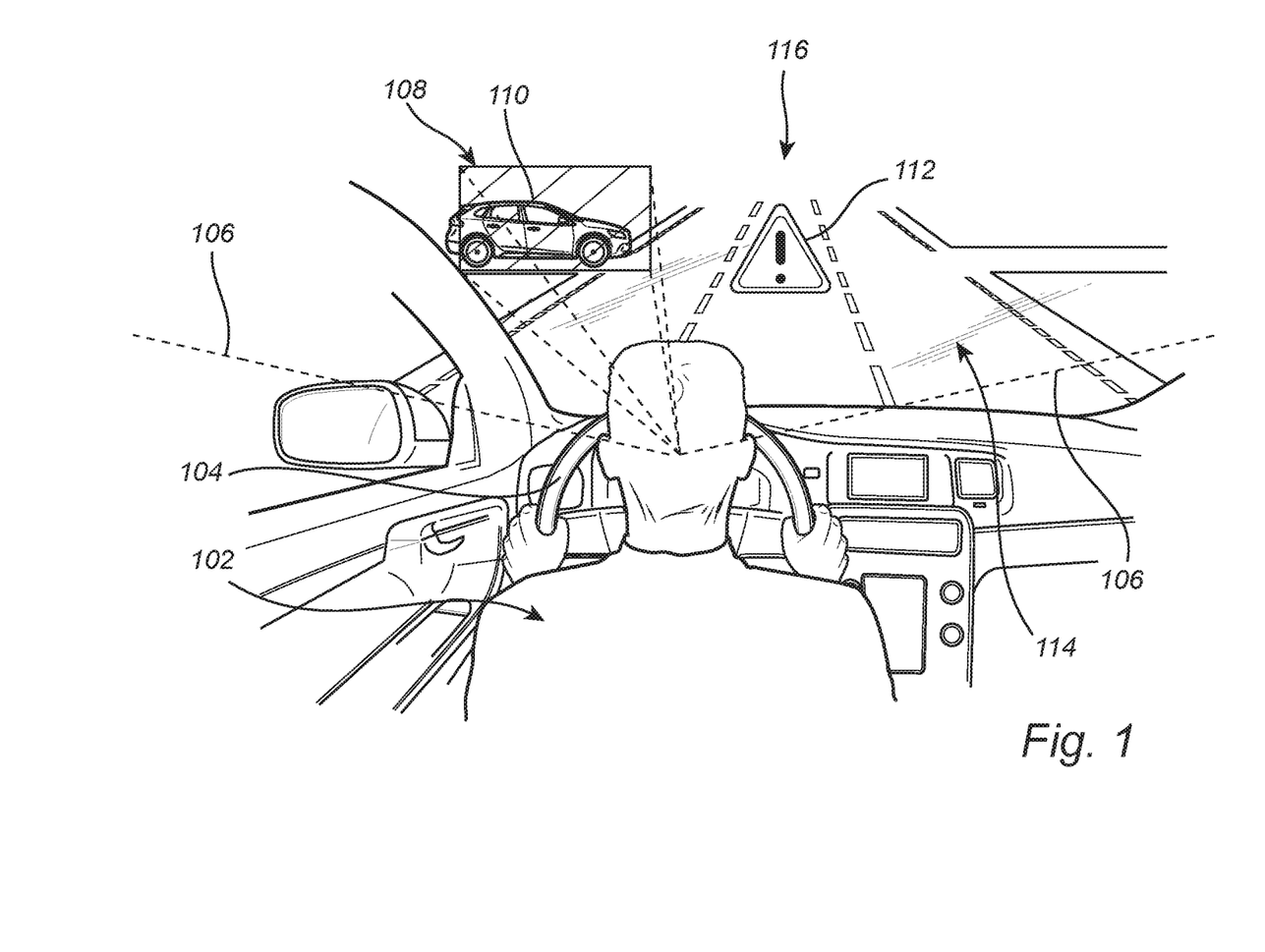
FIG. 1 conceptually illustrates a driver with impaired eye sight receiving a visual alert about an object present in a portion of a field of view of the driver where the driver has impaired eye sight.

FIG. 1 illustrates a driver 102 having impaired eye sight situated in a driver's seat of a vehicle and steering the vehicle by means of a steering wheel 104 located in front of the driver 102. The driver's field of view, conceptually defined by the dashed lines 106, includes a field of view portion 108 where the driver has impaired eye sight. As the driver 102 is operating the vehicle forward, an object in the form of a secondary vehicle 110 approaches from the left or is at least present in the forward-looking field of view 106 of the driver 102. Since the secondary vehicle 110 is present in the field of view portion 108 where the driver has impaired eye sight, the secondary vehicle 110 is difficult to visually detect for the driver 102. However, the vehicle comprises an object detection system (not shown) configured to detect and locate objects near the vehicle. The object detection system may provide a signal indicative of the location of an object, e.g. the secondary vehicle 110 relative the vehicle. Based on the received indication of the location of the object, it is determined that the detected object is at least partly within the portion 108 of the field of view of the driver where the driver has impaired eye sight. In the illustrated scenario in FIG. 1, the secondary vehicle 110 is present in the field of view portion 108, whereby an alerting device, herein in the form of a projection device is controlled to provide an alert 112 to the driver indicating the presence of the object. The visual alert 112 is projected in a windshield 114 of the vehicle.

The alerting device is hear shown to provide a visual alert. However, the alert may be e.g. a haptic alert, an audio alert, a visual alert or combinations thereof.

Figure 2:
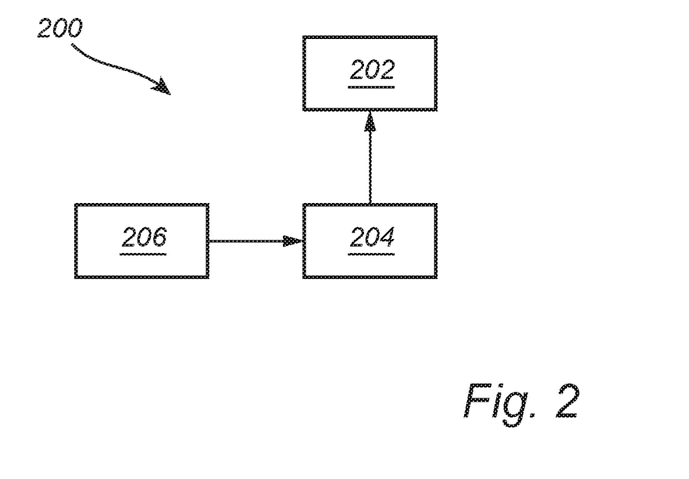
FIG. 2 is a box diagram of a system according to embodiments of the present disclosure.

FIG. 2 is a box diagram of a system 200 according to embodiments of the present disclosure. FIG. 2 will be discussed in conjunction with FIG. 1. The system 200 comprises an alerting device 202 configured to provide an alert to the driver. For example, the alerting device may be a projection device configured to project visual indications in the field of view 106 of the driver 102. The system further comprises a control unit 204 configured to obtain an indication of a location of an object 110, relative the vehicle, wherein the object is detected by an object detection system 206 of the vehicle.

The control unit 204 is configured to determine, based on the received indication of the location of the object, that the detected object is at least partly within the portion 108 of a field of view of the driver where the driver has impaired eye sight. When the object is determined to be present in the portion 108 of a field of view of the driver where the driver has impaired eye sight, the control unit is configured to control the alerting device 202 to provide an alert to the driver indicating the presence of the object 110.

The inventor realized that by providing information about portions in a driver's field of view where the eye sight is not proficient, it is possible to tailor the alerts to the driver so that they appear when an object is present in a portion of a field of view of the driver where the driver has impaired eye sight. In this way, the driver with deficient eye sight in some field of view zones may receive alerts so that he/she may more safely drive the vehicle and the risk of accidents is thereby reduced.

As is illustrated in FIG. 1, it is not required that the entire object 110 lies within the portion 108 of a field of view of the driver where the driver has impaired eye sight for the alert 112 to be provided. The alert may be provided if at least a portion of the object is determined to be present within the field of view portion 108.

The alerting device may be provided as a projection device configured to provide visual alerts to the driver. The projection device is preferably configured to project the visual indications in the windshield 114 of the vehicle. For this, the projection device may be provided as a head-up display device including a projector which projects images in the windshield 114. In some possible implementations the head-up display device may project the visual indications in a receiving transparent display arranged between the driver and the windshield, in the field of view of the driver. A head up display device may generally be considered any type of transparent display device which allow for presenting visual indications to the driver in such a way that the driver don't have to look away from a usual view point.

Preferably, as is illustrated in FIG. 1, the control unit 204 is configured to control the projection device 202 to project the visual alert 112 to the driver in a portion 116 in the driver's field of view where the driver has proficient sight. In other words, the control unit is provided with information indicating field of view portions where the driver has impaired eye sight and field of view portions where the driver has proficient eye sight, e.g. healthy eye sight. Thereby, the control unit 202 may firstly determine that an object is present in a portion 108 of a field of view of the driver where the driver has impaired eye sight, and thereafter provide the visual alert 112 in a portion 116 of a field of view of the driver where the driver has proficient eye sight of the driver to make sure that the driver 102 is capable of visually detecting the visual alert 112. The visual alert 112 may be projected near the center point of the field of view 106 provided that it is projected in a portion 116 of field of view where the driver has proficient sight to see the visual alert 112.

In some embodiments, the individual driver's eye sight in the field of view from the driver's seat is pre-calibrated and stored in a predetermined map including indications of the portion of the field of view of the driver where the driver has impaired eye sight.

In some embodiments, the control unit 204 may be configured to receive an indication of the user identity and retrieve a predetermined map specific to the identified user. Thus, depending on the driver identity, a specific predetermined map is retrieved from a storage device. The user identity may be determined using e.g. biometric sensors in the vehicle or from the identity of a key fob specific to a driver.

Figure 3:
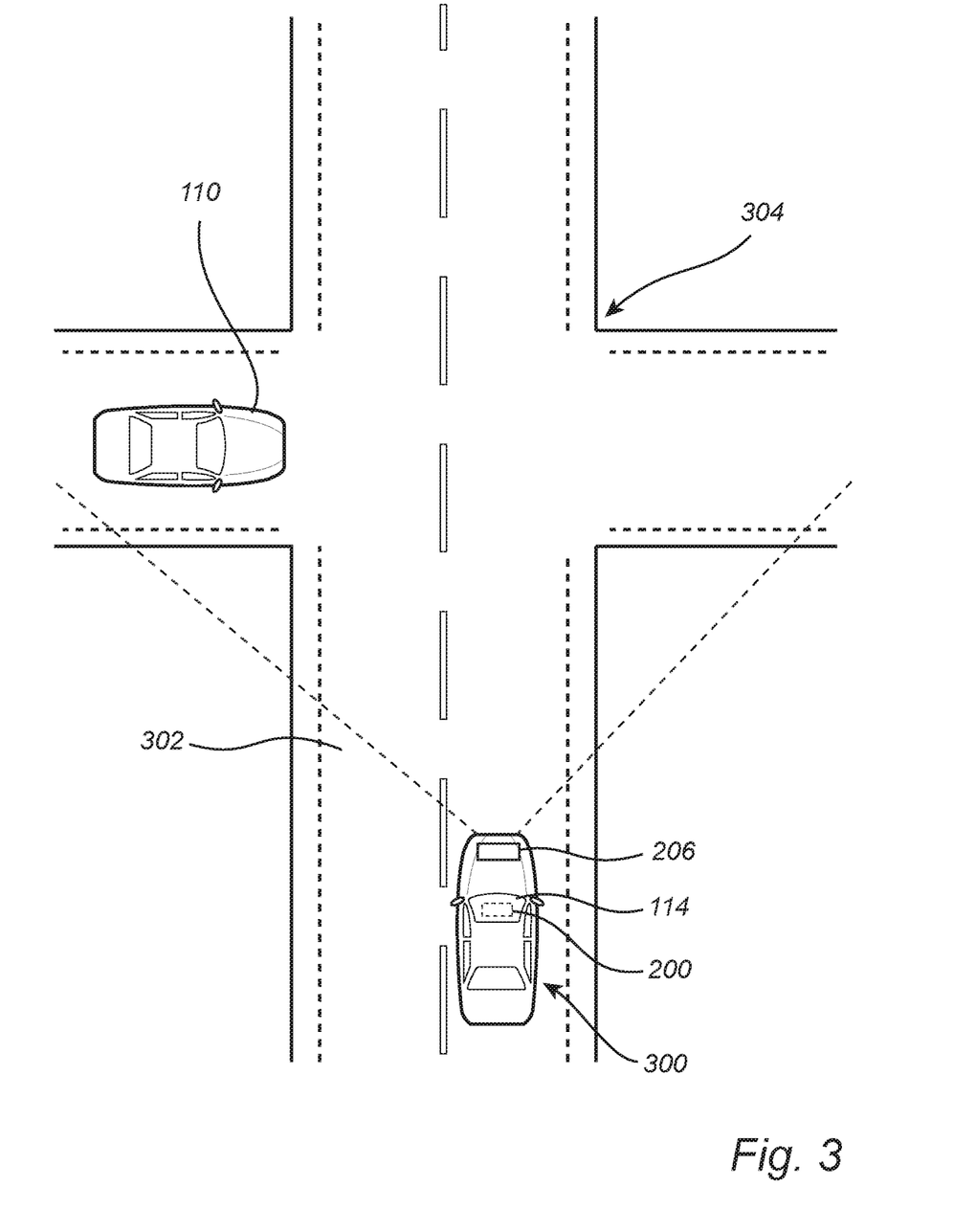
FIG. 3 conceptually illustrates a vehicle comprises a system according to embodiments of the present disclosure.

FIG. 3 schematically illustrates a vehicle 300 comprising a system 200 for alerting a vehicle driver, having impaired eye sight, of an object 110 present in a portion of a field of view of the driver where the driver has impaired eye sight. The vehicle 300 comprises an object detection system 206 adapted to detect and locate objects near the vehicle 300. In this shown example scenario, the vehicle 300 is driving on a road 302 and is approaching an intersection 304 at which a secondary vehicle 110 is present on the left side, possibly on its way to enter the road 302.

The object detection system 204 may include at least one of an image capturing device such as a camera, a Radar, and/or a Lidar. Such object detection systems including e.g. a camera, and/or a Radar, and/or Lidar, may be configured to classify detected objects, i.e. as a bicycle, tree, car, truck, etc., and the location of the classified object. The classification and the location may in other applications be used for determining actions for e.g. avoiding an accident, e.g. as applied by adaptive cruise control or collision avoidance systems. The same information may be used as a map of the detected objects near and ahead of the vehicle. The locations of the objects in the map is mathematically projected on the driver's field of view, for example in the windshield of the vehicle.

When the system 200 receives information of a detected object 110, it may compare the location of the detected object 110 as projected onto the windshield, to the predetermined map as described herein, so that the driver may become aware of the object 110 if the object 110 is in portion 108 of a field of view of the driver where the driver has impaired eye sight.

Optionally, the vehicle 200 may comprise a driver monitoring system including sensors such as a camera or Lidar. The driver monitoring system may track the motion of the driver's head and adjust the locations of the portions of a field of view of the driver where the driver has impaired eye sight, as compared to the location of the detected objects accordingly.

Figure 4:
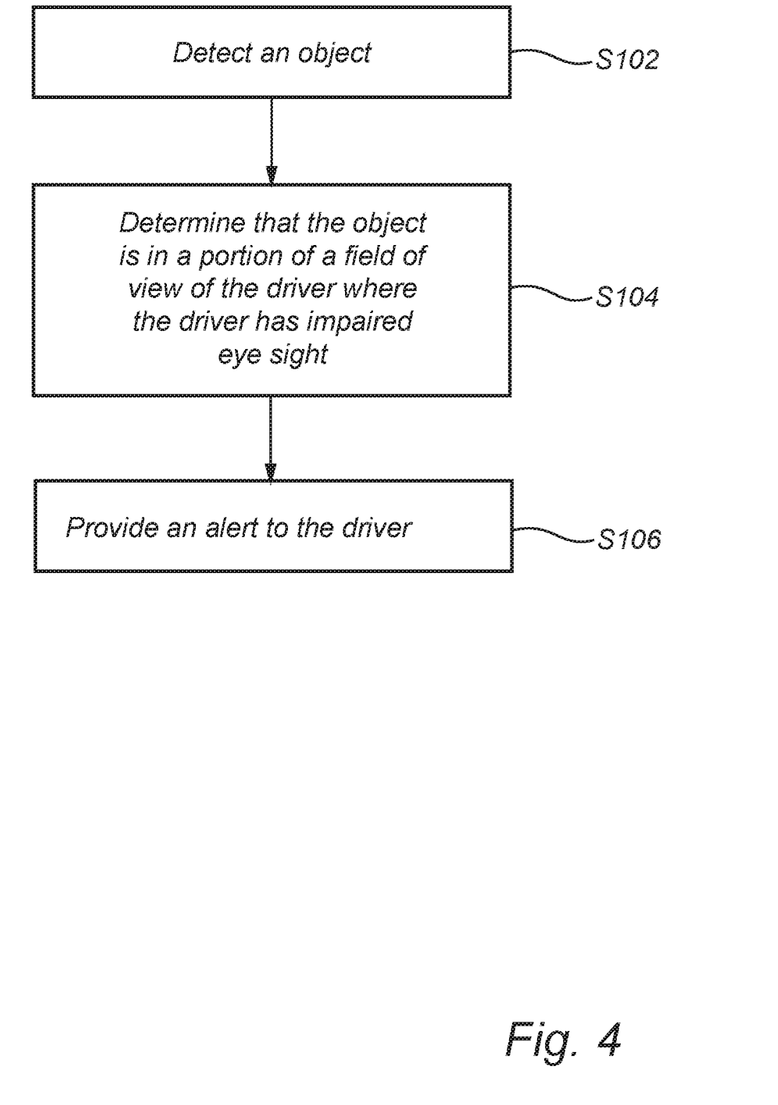
FIG. 4 is a flow-chart of method steps according to embodiments of the present disclosure.

FIG. 4 is a flow-chart of method steps according to embodiments of the present disclosure. In step S102, detecting an object in the proximity of the vehicle in a forward-looking field of view of the driver. In step S104, determining, based on the location of the object, that the detected object is at least partly within the portion of a field of view of the driver where the driver has impaired eye sight. When the object is determined to be present in a field of view of the driver where the driver has impaired eye sight, providing an alert to the driver indicating the presence of the object in step S106.

Figure 5:
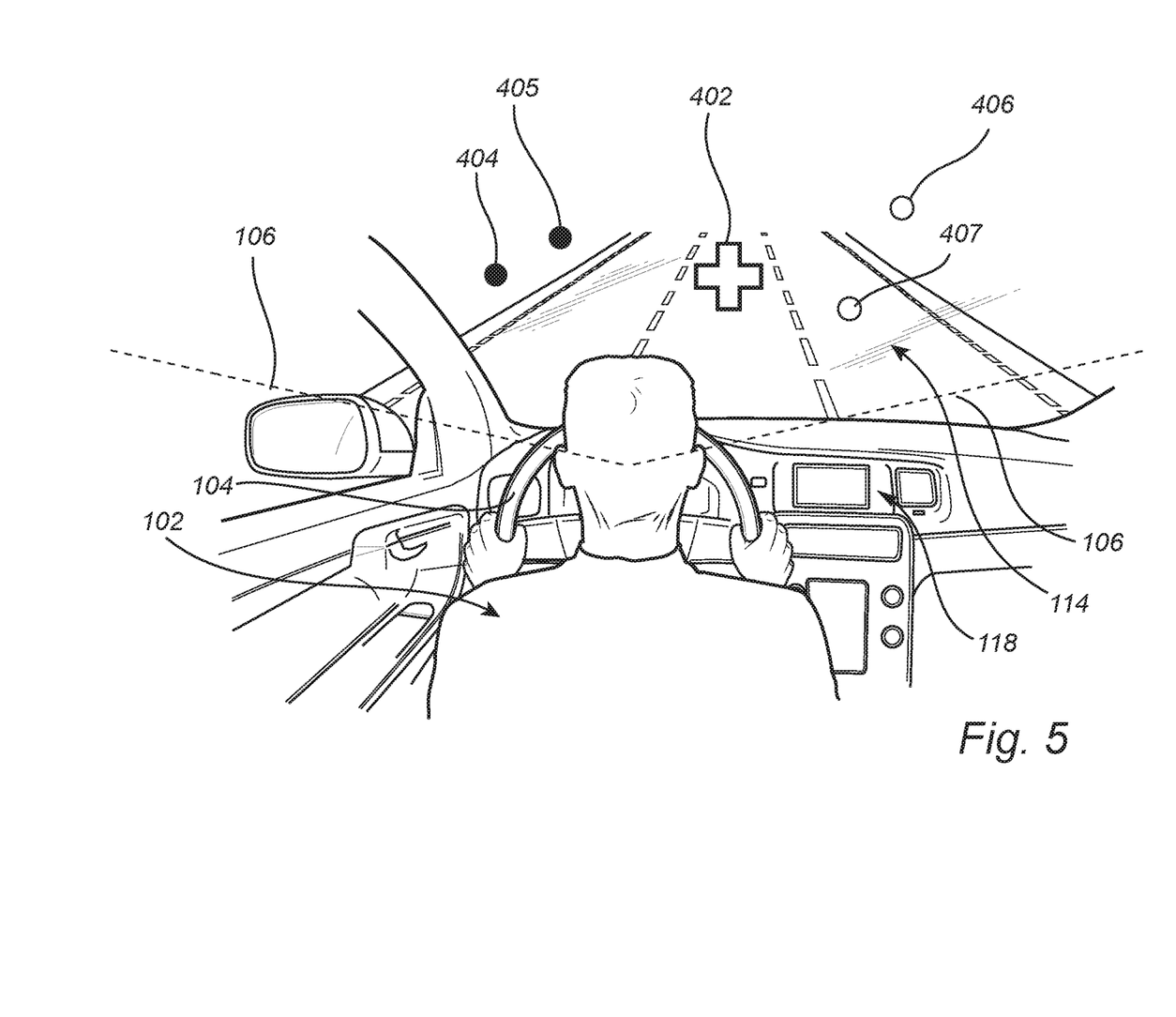
FIG. 5 conceptually illustrates calibrating a driver's eye sight in the field of view from the driver's seat for determining the predetermined map according to embodiments of the present disclosure.

FIG. 5 conceptually illustrates calibrating the individual driver's eye sight in the field of view from the driver's seat for determining a predetermined map. The predetermined map may cover the forward-looking field of view 106 of the driver 102 as seen through the windshield 114. The driver 102 is situated in the driver's seat facing the windshield 114. Preferably, the driver 102 is instructed to have his/her default focus point on a center marking 402 projected in the windshield 114 by the projection device. While the driver 102 focuses his/her eyes on the center marking 402, calibration markings 404, 405, 406, 407 are sequentially projected in the windshield 114. The center marking 402 is preferably distinguishable from the calibration markings 404-407. For example, here the center marking is a cross 402, and the calibration markings 404, 405, 406, 407 are dots. However, the shape of the markings may take any suitable form.

As each calibration marking 404-407 is projected, the driver 102 is requested to confirm that he/she can see the projected calibration marking. The confirmation may be performed in various ways, for example by pressing a button on the steering wheel 104 or on the center module 118 in the vehicle, or by providing a voice command to a voice recognition system of the vehicle. Here only four projected calibration markings 404, 405, 406, 407 are shown for exemplary purposes. The number of calibration markings may be tailored for specific cases and is often more four.

In this example case illustrated in FIG. 5, the driver confirmed that he/she was able to see the calibration markings 406 and 407. The calibration markings 404 and 405, shown solid purely for illustrative purposes were not confirmed by the driver 102 and are therefore considered to be included in a portion 108 of a field of view of the driver where the driver has impaired eye sight (see FIG. 1). The determination may be performed similar to the so-called Humphrey visual field testing. The predetermined map of the driver's field of view may include information of the location of calibration markings that we confirmed by the driver and of those that were not confirmed by the driver. In this way is an accurate map of the driver's eye sight in the field of view from the driver's seat provided to the system 200.

Preferably, the windshield 114 may be used as the plane of projection of the objects locations as detected by the object detection system if the windshield is used as display for projecting the markings during the calibration of the user's field of view, i.e. the object locations and the calibration markings are projected in the same surface.

Figure 6A:
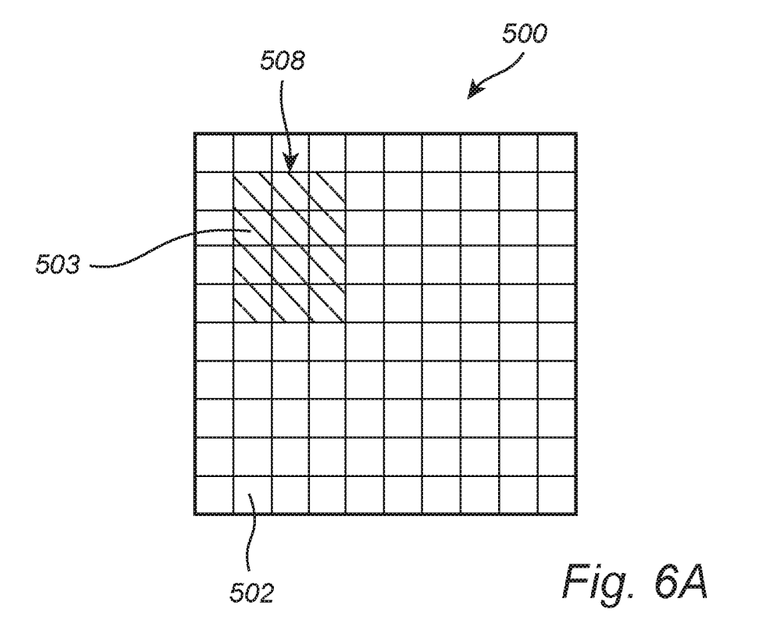
FIG. 6A conceptually illustrates a predetermined map of a person's field of view according to embodiments of the present disclosure.

FIG. 6A conceptually illustrates a predetermined map 500 of a driver's field of view as determined from a calibration e.g. as described with reference to FIG. 5. The map 500 is illustrated as a grid of the driver's field of view. The boxes 502, 503 (not all are numbered) or "pixels" represent different portions of the driver's field of view. An empty box 502 here represents field of view portion where the driver has proficient sight, i.e. where the driver was able to confirm the presence of a calibration marking during calibration. A dashed box 503 represent a field of view portion where the driver could not confirm the presence of a calibration marking during calibration. The group 508 of dashed boxes 503 represents portion of a field of view of the driver where the driver has impaired eye sight.

Figure 6B:
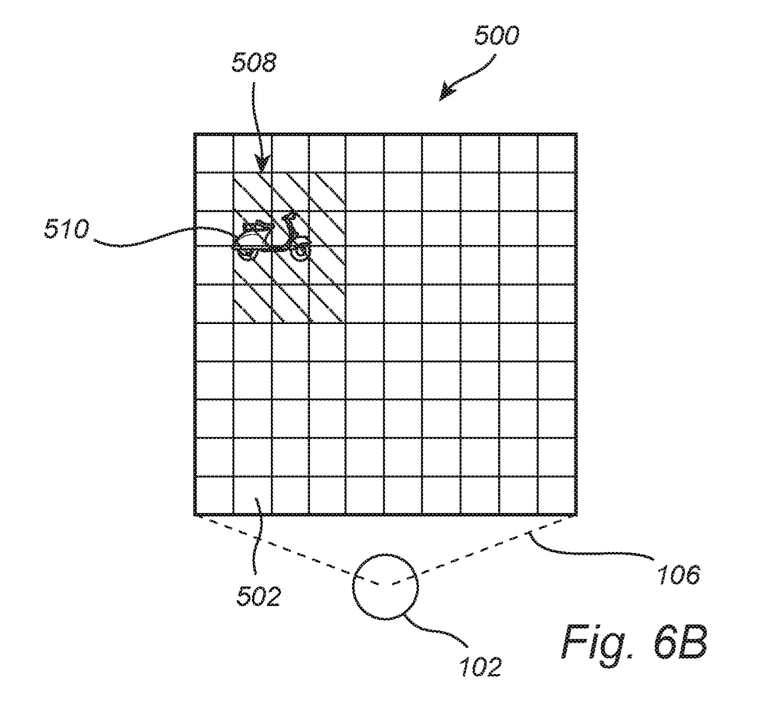
FIG. 6B conceptually illustrates the predetermined map in FIG. 6A overlay with the location of an object.

FIG. 6B conceptually illustrates the predetermined map 500 of the driver's field of view 106 overlay with the location of a detected object, here a motorbike 510. As seen from the user 102, the location of the motorbike 510 falls within the portion 508 of a field of view of the driver where the driver has impaired eye sight. Accordingly, a visual alert signal is projected in e.g. the windshield in a part of the driver's field of view outside of the field of view portion 508.

Figure 7:
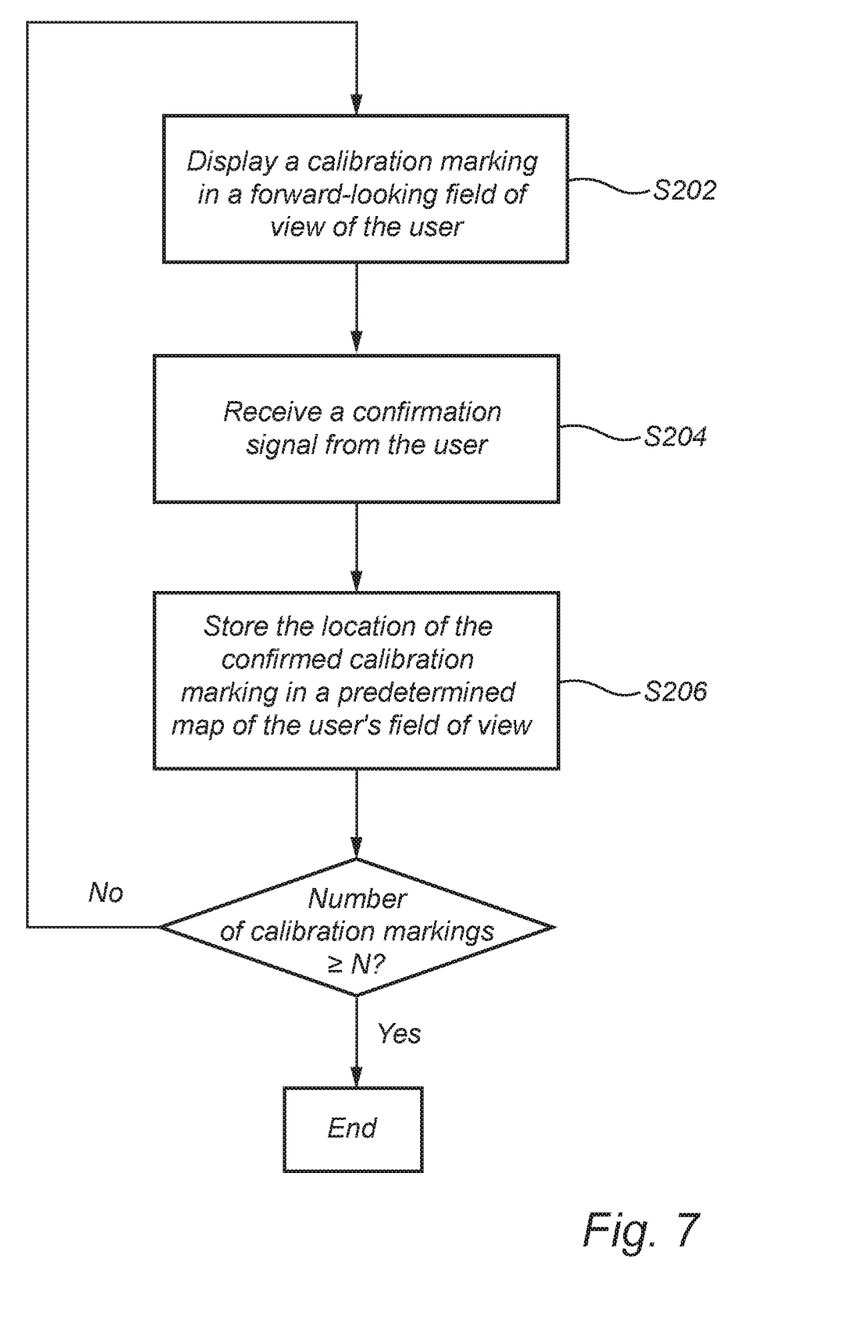
FIG. 7 is a flow-chart of method steps according to embodiments of the present disclosure.

FIG. 7 is a flow chart of method steps according to embodiments related to calibration for producing a predetermined map of a driver's field of view. In step S202, displaying a marking in a forward-looking field of view of the user. In step S204, receiving a confirmation signal from the user indicating that the user can see the marking. In step S206, storing the locations of markings that was confirmed by the user in a predetermined map of the user's field of view. Repeating the above steps S202-S206 multiple times for markings at different locations in the forward-looking field of view of the user. The number of repetitions N of steps S202-S206 are selected such that a satisfactory coverage of the driver's field of view is provided. Markings in different repetition iterations are projected in different locations. Finally, a predetermined map of the driver's field of view is provided once the process has ended.

Generally, the vehicle according to the present disclosure may be a car, truck, bus, train, boat, or any heavy-duty or light-duty vehicle.

It is possible, but not required, that the system for alerting a vehicle driver includes the object detection system.

The communication between the control unit and other devices, systems, or components may be hardwired or may use other known electrical connection techniques, or wireless networks, known in the art such as via CAN-buses, Bluetooth, Wifi, 3G, 4G, 5G, etc.

A control unit may include a microprocessor, microcontroller, programmable digital signal processor or another programmable device, as well as be embedded into the vehicle/power train control logic/hardware. The control unit may also, or instead, include an application-specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may comprise modules in either hardware or software, or partially in hardware or software and communicate using known transmission buses such as CAN-bus and/or wireless communication capabilities.

A control unit of the present disclosure is generally known as an ECU, electronic control unit.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A control unit for alerting a vehicle driver, having impaired eye sight caused by a defect in the eye sight of the driver, of an object present in a portion of a field of view of the driver where the driver has impaired eye sight, the control unit being configured to:
   receive an indication of a location of a detected object, relative to the vehicle;
   determine, based on the received indication of the location of the object, that the detected object is at least partly within the portion of the field of view of the driver where the driver has impaired eye sight caused by the defect in the eye sight of the driver; and
   generate, in response to determining that the detected object is at least partly within the portion of the field of view of the driver where the driver has impaired eye sight, a signal to control an alerting device to provide an alert to the driver indicating the presence of the object.

2. The control unit according to claim 1, wherein the alerting device is a projection device configured to provide a visual alert to the driver indicating the presence of the object.

3. The control unit according to claim 2, wherein, the control unit is configured to control the projection device to project the visual alert to the driver in a portion of the driver's field of view where the driver has proficient sight.

4. The control unit according to claim 1, wherein the alerting device includes a head up display device.

5. The control unit according to claim 2, wherein the projection device is configured to project the visual alerts in the windshield of the vehicle.

6. The control unit according to claim 1, wherein the individual driver's eye sight in the field of view from the driver's seat is pre-calibrated and stored in a predetermined map including indications of the portion of the field of view of the driver where the driver has impaired eye sight.

7. The control unit according to claim 6, wherein the predetermined map covers the forward-looking field of view of the driver through the windshield.

8. The control unit according to claim 6, wherein the predetermined map includes locations in the windshield where the driver has proficient sight as confirmed by the driver.

9. The control unit according to claim 6, wherein the control unit is configured to receive an indication of the user identity, and to retrieve a predetermined map specific to the identified user.

10. An alerting device for alerting a vehicle driver, having impaired eye sight caused by a defect in the eye sight of the driver, of an object present in a portion of a field of view of the driver where the driver has impaired eye sight, the alerting device being configured to:
    receive an indication that a location of the detected object overlaps, at least partly, the portion of the field of view of the driver where the driver has impaired eye sight caused by the defect in the eye sight of the driver; and
    provide, in response to an indication that the location of the detected object overlaps, at least partly, the portion of the field of view of the driver where the driver has impaired eye sight, an alert to the driver indicating the presence of the object.

11. The alerting device according to claim 10, wherein the altering device is a projection device configured to provide a visual alert in the field of view of the driver.

12. The alerting device according to claim 11, wherein the visual alert is projected in a portion of the driver's field of view where the driver has proficient sight.

13. The alerting device according to claim 11, including a head up display device.

14. A system for alerting a vehicle driver, having impaired eye sight caused by a defect in the eye sight of the driver, of an object present in a portion of a field of view of the driver where the driver has impaired eye sight, the system comprising:
    an alerting device configured to provide an alert to the driver; and
    a control unit configured to:
    obtain an indication of a location of an object, relative to the vehicle, wherein the object is detected by an object detection system of the vehicle;
    determine, based on the received indication of the location of the object, that the detected object is at least partly within the portion of a field of view of the driver where the driver has impaired eye sight caused by the defect in the eye sight of the driver; and
    when the object is determined to be present in portion of a field of view of the driver where the driver has impaired eye sight, control the alerting device to provide an alert to the driver indicating the presence of the object.

15. The system according to claim 14, wherein the alerting device is a projection device configured to provide a visual alert to the driver indicating the presence of the object.

16. A vehicle comprising the system according to claim 14.

17. A method for alerting a vehicle driver, having impaired eye sight caused by a defect in the eye sight of the driver, of an object present in a portion of a field of view of the driver where the driver has impaired eye sight, the method comprising the steps of:
- detecting an object in the proximity of the vehicle in a forward-looking view of the driver;
- determining, based on the location of the object, that the detected object is at least partly within the portion of a field of view of the driver where the driver has impaired eye sight caused by the defect in the eye sight of the driver, and
- providing an alert to the driver indicating the presence of the object.

18. The method according to claim 17, wherein the alert is a visual alert provided in the field of view of the driver, in a in a portion of the driver's field of view where the driver has proficient sight.

19. The method according to claim 17, wherein the individual driver's eye sight in the field of view from the driver's seat is pre-calibrated and stored in a predetermined map including indications of the portion of the field of view of the driver where the driver has impaired eye sight.

20. The method according to claim 19, wherein the calibration includes:
- displaying a calibration marking in a forward-looking field of view of the user;
- receiving a confirmation signal from the user indicating that the user can see the calibration marking;
- storing the locations of a calibration marking that was confirmed by the user in a predetermined map of the user's field of view, and
- repeating the above steps multiple times for calibration markings at different locations in the forward-looking field of view of the user.

* * * * *